(12) United States Patent
Ikeda et al.

(10) Patent No.: US 6,650,531 B2
(45) Date of Patent: Nov. 18, 2003

(54) LAMINATED ELECTRIC DOUBLE LAYER CAPACITOR MODULE

(75) Inventors: Katsuji Ikeda, Yokohama (JP); Yoshihiro Hozumi, Yokohama (JP); Masami Kashihara, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 17 days.

(21) Appl. No.: 10/206,221

(22) Filed: Jul. 29, 2002

(65) Prior Publication Data

US 2003/0035262 A1 Feb. 20, 2003

(30) Foreign Application Priority Data

Jul. 30, 2001 (JP) ........................... 2001-230235

(51) Int. Cl.[7] ................................. H01G 9/00
(52) U.S. Cl. ................. 361/502; 361/517; 361/512
(58) Field of Search ......................... 361/502, 503, 361/508, 509, 511, 512, 516, 517, 518, 579, 535–537; 29/25.03

(56) References Cited

U.S. PATENT DOCUMENTS 5,850,331 A 12/1998 Matsumoto et al.
6,182,546 B1 * 2/2001 Hecker ........................ 83/56
6,264,707 B1 7/2001 Ishikawa et al.
6,532,144 B2 * 3/2003 Ohya et al. ................. 361/502

FOREIGN PATENT DOCUMENTS

| DE | 100 06 839 | 8/2000 |
| EP | 1 061 539 | 12/2000 |
| JP | 2001-35450 | 2/2001 |

* cited by examiner

*Primary Examiner*—Anthony Dinkins
(74) *Attorney, Agent, or Firm*—Oblon, Spivak, McClelland, Maier & Neustadt, P.C.

(57) ABSTRACT

A laminated electric double layer capacitor module having electrode assemblies with positive and negative electrodes disposed to face each other, an ion permeable separator disposed between adjacent electrode assemblies so as to separate respective electrode layers from each other, a metal current collector plate for the positive electrodes, and a metal current collector plate for the negative electrodes, an electrolyte, and a module case. The electrode assemblies, the separators, and the current collector plates for the positive and negative electrodes are integrated into a laminated assembly of the capacitor module. A plurality of laminated assemblies are accommodated in a plurality of element compartments and electrically connected in series.

11 Claims, 9 Drawing Sheets

LAMINATED ELECTRIC DOUBLE LAYER CAPACITOR MODULE

The present invention relates to a laminated electric double layer capacitor module, particularly to a laminated electric double layer capacitor module having a high output density and a high energy density per volume or per weight.

An electric double layer capacitor is excellent in the output density or the long-term reliability for charge/discharge cycles, and it is being employed as a power source for a hybrid electric car or as an emergency electric power source. In such a power source application, a high voltage at a level of a few hundreds V is required.

Usually, the operating voltage of a unit cell of an electric double layer capacitor is from 0.6 to 0.8 V in a case where the electrolyte is an aqueous solution type, or from 2.0 to 3.3 V in a case where the electrolyte is a non-aqueous solution type. Accordingly, such unit cells are used in the form of a high voltage power source module in which from a few tens to a few hundreds of such unit cells are connected in series.

As the structure of such a unit cell, a prismatic cell or a cylindrical cell is common. A prismatic cell is as shown in FIG. 8 i.e. a plurality of flat plate positive and negative electrodes 7A and 7B are alternately stacked with a separator 2 interposed in-between to form multilayer element assembly, and the assembly is accommodated in a prismatic case 11. From the respective electrodes 7A and 7B, flat plate leads 8A and 8B extend upwardly and bundled, respectively, at lead joint portions 9A and 9B as divided into positive electrodes and negative electrodes. The lead joint portions 9A and 9B are connected and secured to positive and negative terminals 10A and 10B, respectively, which are secured as passed through the prismatic case 11.

A cylindrical cell is as shown in FIG. 9 i.e. a pair of long strip-shaped positive and negative electrodes 1A and 1B and a separator 13 interposed therebetween, are wound up to form a winding element, and this winding element is accommodated in a cylindrical case 15 to form a cylindrical cell. Leads 5A and 5B are connected to the upper ends of the positive and negative electrodes 1A and 1B, respectively. These leads 5A and 5B are connected to the positive and negative electrode terminals 4A and 4B, respectively, which are secured as passed through a sealing insulating plate 3. For example, as shown in FIG. 10, a plurality of unit cells 20 thus constructed, are connected in series to constitute a high voltage power source module.

However, in order to integrally secure the plurality of unit cells 20, strongly-built module structural members 21 are required, and in order to electrically connect the unit cells 20 in series, many connecting bus bar members 23 are required.

Accordingly, after finishing into a high voltage power source module, the weight increase and the volume increase required to form the module, are substantial, and as the high voltage power source module as a whole, the output density and the energy density deteriorate substantially. Namely, there has been a problem that the high output density as a merit of an electrical double layer capacitor is lost, and the low energy density becomes distinct.

The present invention has been made in view of such problems of the prior art, and it is an object of the present invention to provide a laminated electric double layer capacitor module having a high output density and a high energy density per volume or per weight.

The present invention provides a laminated electric double layer capacitor module comprising:

electrode assemblies for positive and negative electrodes disposed to face each other, each comprising a metal current collector foil and an electrode layer made of a large surface area material, formed on at least one surface of the foil except for an end strip portion along one side end of the foil;

an ion permeable separator disposed between the adjacent electrode assemblies to separate the respective electrode layers from each other;

a metal current collector plate for positive electrodes and a metal current collector plate for negative electrodes, electrically connected to the end strip portion of each electrode assembly for positive electrode and the end strip portion of each electrode assembly for negative electrode, respectively;

an electrolyte; and a module case; wherein:

a) the electrode assemblies for positive and negative electrodes are alternately laminated in plurality so that the respective end strip portions are projected from the separators on opposite sides, to form a laminated element;

b) the metal current collector plate for positive electrodes, is disposed at the end of the laminated element on the side where the end strip portions of the metal current collector foils for positive electrodes are projected from the separators;

c) the metal current collector plate for negative electrodes, is disposed at the end of the laminated element on the side where the end strip portions of the metal current collector foils for negative electrodes are projected from the separators;

d) the electrode assemblies, the separators, the current collector plate for positive electrodes and the current collector plate for negative electrodes, are integrated to constitute a laminated element assembly;

e) a plurality of such laminated element assemblies are provided, and each of them is accommodated and protected in one of element compartments formed in plurality in the module case; and f) the plurality of the laminated element assemblies accommodated in the plurality of the element compartments, respectively, are electrically connected in series.

The module of the present invention does not require to employ strongly-built module structural members to integrally secure the plurality of cells or many electrical connecting members for cells, which used to be required to construct a high voltage power source module by connecting unit cells in series. According to the present invention, it is possible to increase the energy density per volume or per weight, as a module power source. Especially when a resin case lighter than a metal, is used as the module case, the energy density can further be increased. Further, the process until a final laminated module power source is prepared, can be simplified, and the number of components required, is small, whereby the productivity is excellent, and the production cost can be reduced.

In the present invention, it is preferred that the module case comprises a module case main body provided with said element compartments, and a module case cover to close the module case main body.

By this construction, the module case is constituted by the module case main body and the module case cover, whereby the production is easy, and the repair services, etc., are easy.

Further, in the present invention, it is preferred that a connecting means is provided which is connected to the current collector plate for positive electrodes and/or the current collector plate for negative electrodes through a partition wall partitioning the adjacent element compartments of the module case main body or through both side walls of the module case main body.

Thus, by using some components constituting the case for unit cells in common to construct a structure comprising module-constituting members and electrical connecting members between cells, it is possible to obtain a laminated electric double layer capacity module which is more compact and lighter in weight.

Further, the adjacent unit cells can be connected in the minimum distance without requiring bus bars or the like, whereby the resistance as a module power source can be made lower than before.

Now, the present invention will be described with reference to the preferred embodiments.

Among various members constituting the laminated electric double layer capacitor module according to an embodiment of the present invention, the detailed construction of an electrode assembly 31 will be described first. An enlarged perspective view of an electrode assembly 31 is shown in FIG. 1.

Figure 1:
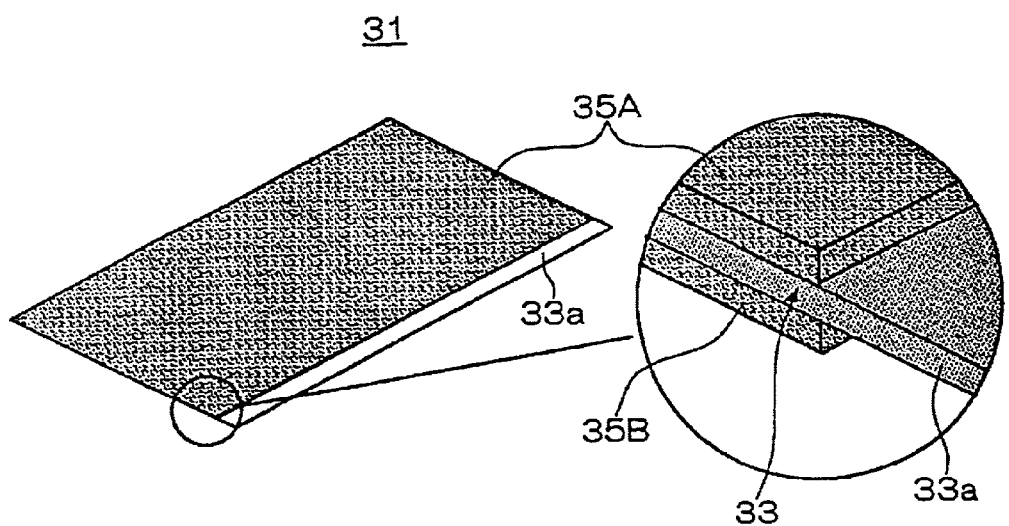
FIG. 1 is an enlarged perspective view of an electrode assembly.

In FIG. 1, the electrode assembly 31 which will be a positive electrode or a negative electrode, comprises a band-shaped or strip-shaped metal current collector foil 33 and electrode layers 35A and 35B made of a high surface area material, formed on both sides of the foil except for an end strip portion 33a along one side end of the foil.

The metal current collector foil 33 to be used here, is not particularly limited, so long as it is excellent in the electrochemical corrosion resistance on the positive electrode side. However, from the viewpoint of processability and weight reduction, a foil material of aluminum, an aluminum alloy or stainless steel, is preferred.

Its thickness is set to be thin so far as the strength permits, and it is usually preferably within a range of from 20 to 100 $\mu$m. Further, for the purpose of improving the adhesion strength with the electrode layers 35A and 35B or reducing the electric resistance, chemical, electrochemical or mechanical surface etching treatment may be applied in many cases.

The end strip portion 33a on which no electrode layer such as 35A or 35B is formed, is designed for electrical connection to the exterior. Accordingly, to increase the cell capacity, it is preferably as narrow as possible and is preferably at a level of from 2 to 6 mm.

The electrode layers 35A and 35B are formed on both sides of the metal current collector foil 33 and made of a high specific surface area material to form an electric double layer at the interface with the electrolyte for storage, and they may be coated ones or preformed thin electrode sheets which are bonded to the metal current collector foil 33.

To bond the electrode sheet to the metal current collector foil 33, it is common to employ mechanical pressure welding or a method of bonding by means of a conductive adhesive. To form the electrode layers 35A and 35B, a binder is usually required, and various organic binders, particularly binders such as polytetrafluoroethylene and polyvinylidene fluoride, are preferably employed.

Further, in order to assist the electric conduction of the electrode layers 35A and 35B, a conduction-assisting agent may be added in a certain amount. The above-mentioned high specific surface area material is made mainly of a carbonaceous material having a specific surface area of from 100 to 3,000 $m^2/g$.

Specifically, activated carbon of a resin type such as phenol, a coconut shell type, a coke type or a pitch type as well as carbon nanotubes, carbon aerogel or polyacene, may, for example, be preferably employed. As the conduction-assisting agent, carbon black, carbon short fibers or metal fibers, may preferably be employed.

In the present invention, the electrolyte to be used for forming an electric double layer, is preferably a non-aqueous electrolyte, since its withstand voltage is high. The solute contained in the non-aqueous electrolyte is preferably a quaternary onium salt from the viewpoint of the electrical conductivity, the solubility in a solvent and the electrochemical stability.

Especially, it preferably has an onium cation represented by $R^1R^2R^3R^4N^+$ or $R^1R^2R^3R^4P^+$ (wherein each of $R^1$, $R^2$, $R^3$ and $R^4$ which are independent of one another, is a $C_{1-6}$ alky group or a $C_{6-10}$ aryl group). Particularly, it is preferably a salt of the above-mentioned cation with an anion such as $BF_4^-$, $PF_6^-$, $CF_3SO_3^-$, $AsF_6^-$, $N(SO_2CF_3)_2^-$ or $ClO_4^-$.

The concentration of the above onium salt in the electrolyte is preferably at least 0.5 mol/l, particularly preferably at least 1.0 mol/l, for the purpose of securing the amount of ions required for forming the electric double layer and obtaining adequate electrical conductivity.

The organic solvent to be used for the non-aqueous electrolyte is preferably at least one solvent selected from the group consisting of cyclic carbonates such as ethylene carbonate, propylene carbonate and butylene carbonate, straight chain carbonates such as dimethyl carbonate, ethylmethyl carbonate and diethyl carbonate, sulfolane, sulfolane derivatives, and nitrites such as acetonitrile and glutaronitrile.

Further, as the non-aqueous electrolyte, an amidine type ionic liquid i.e. a molten salt at room temperature, may be used as it is or as dissolved in a solvent.

Now, the separator 2 will be described. The separator 2 is a member having ion permeability, interposed between the positive and negative electrode assemblies 31. The material for the separator 2 is not particularly limited, but it is preferably made of a porous material excellent in the electrical insulating property, chemical stability against the electrolyte and liquid absorbing and maintaining properties for the electrolyte.

Specifically, it is preferably made of inorganic fibers such as glass fibers, silica fibers, alumina fibers, asbestos or whiskers thereof, natural fibers such as manila hemp, or organic fibers such as synthetic polymer fibers of e.g. a polyolefin or a polyester. Further, a sheet made thereof, or a micro porous film having fine perforations formed by stretching, may also be preferably employed.

Now, a laminated structure of electrode assemblies 31 and separators 2 will be described. A perspective view of the laminated structure of electrode assemblies 31 and separators 2, is shown in FIG. 2.

Figure 2:
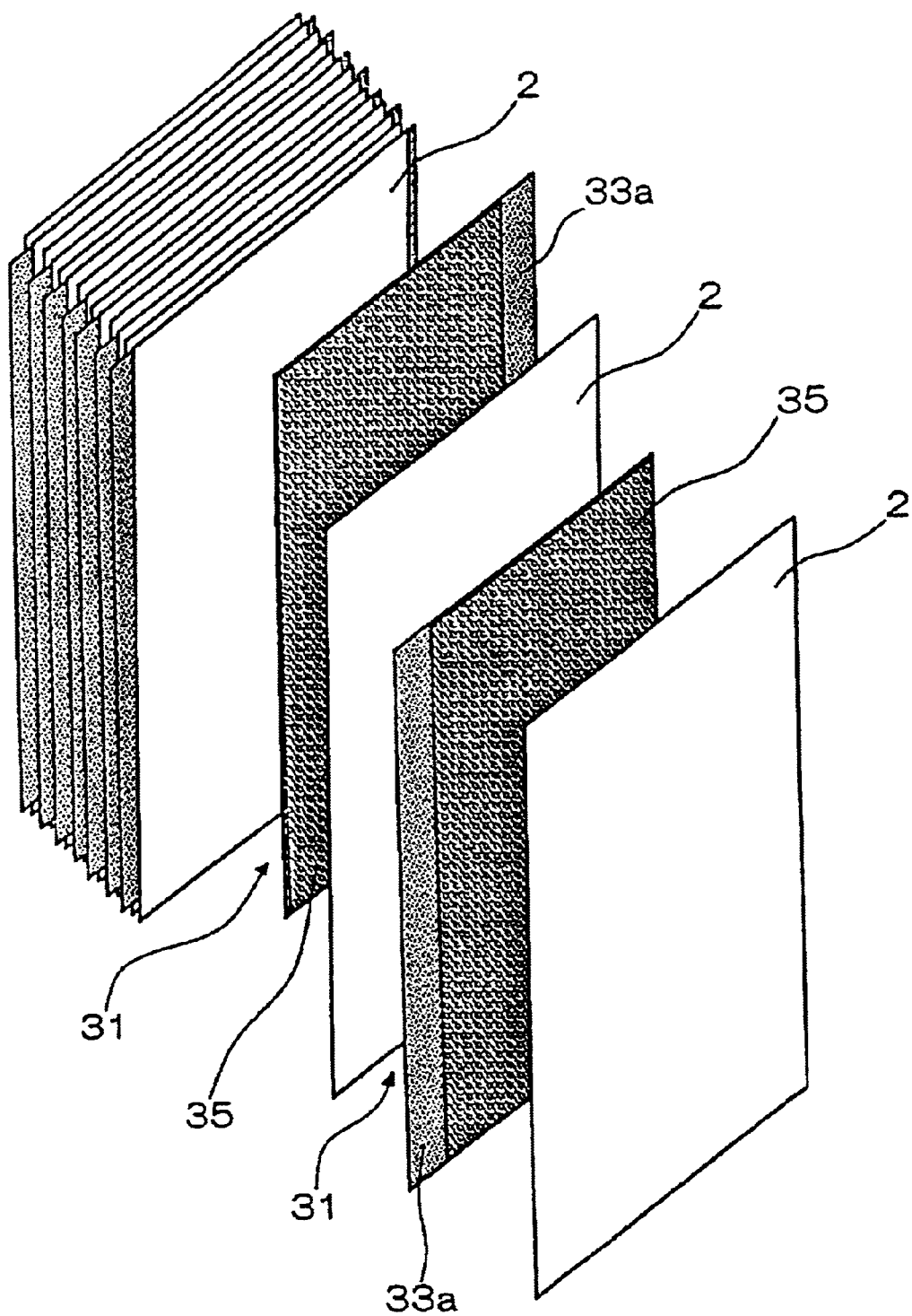
FIG. 2 is a perspective view of a laminated structure of electrode assemblies and separators.

In FIG. 2, band-shaped or strip-shaped separators 2 and band-shaped or strip-shaped electrode assemblies 31 for positive and negative electrodes of the same construction, are disposed alternately.

The respective end strip portions 33a of the electrode assemblies 31 are disposed so that ones adjacent to each other in the width direction of the separators 2, are projected from the separators 2 on opposite sides. And by such electrode assemblies 31 and separators 2, a laminated element 30 is constituted. In this state, at both right and left end surfaces of the laminated element 30, the end strip portions 33a of positive and negative electrodes are, respectively, exposed.

Now, the metal current collector plate 37 will be described. A perspective view of the metal current collector plate 37 is shown in FIG. 3.

Figure 3:
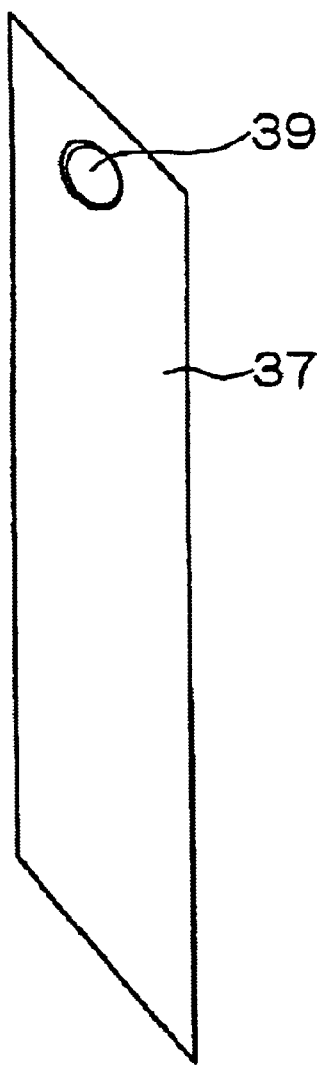
FIG. 3 is a perspective view of a metal current collector plate.

In FIG. 3, a through-hole 39 is provided at an upper portion of the metal current collector plate 37 made of a metal.

Now, the construction of a laminated element assembly will be described. A perspective view of the laminated element assembly 40 is shown in FIG. 4.

Figure 4:
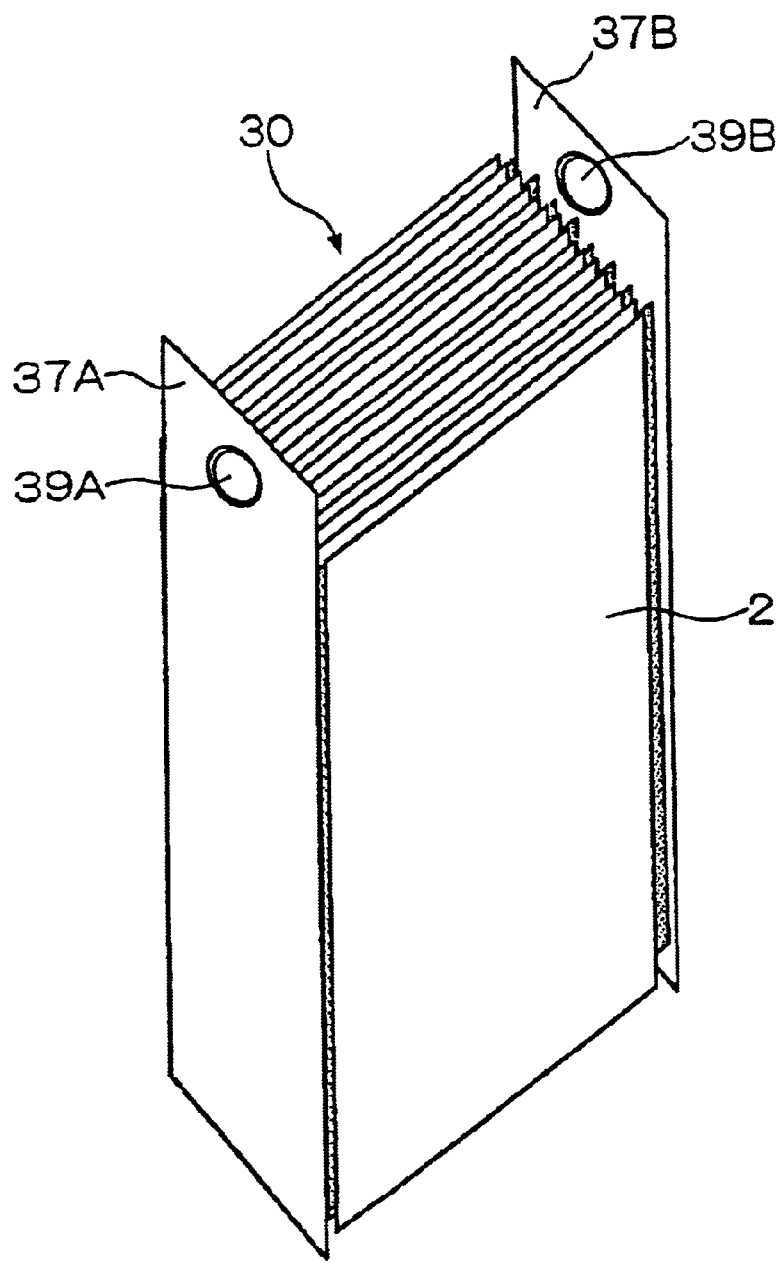
FIG. 4 is a perspective view of a laminated element assembly.

In FIG. 4, the laminated element assembly 40 is constructed in such a manner that the metal current collector plates 37A and 37B are bonded to the end strip portions 33a of the respective metal current collector foils 33 for positive and negative electrodes of the laminated element 30, to establish electrical contact with the exterior, respectively. The method for bonding the metal current collector plates 37A and 37B to the end strip portions 33a may be mechanical pressing or electroconductive adhesion by means of an electroconductive adhesive or the like. However, bonding by welding is preferred which is highly reliable mechanically and electrically.

As the welding method, ultrasonic welding, welding by a laser such as YAG or electron beam welding is preferably employed. The material for the metal current collector plate 37 is not particularly limited so long as it has high electrical conductivity and electrochemical corrosion resistance. However, aluminum or an aluminum alloy is, for example, preferred.

The shape of the metal current collector plate 37 is not particularly limited. However, in order not to impair impregnation of the electrolyte at the end surface of the laminated element 30, it is preferred to provide notches at the flat portion of the metal current collector plate 37 to be abutted against the end surface of the laminated element 30. Otherwise, perforations or irregularities at a part of the flat portion, which bring about similar effects, may be provided.

Now, the module case main body 41 to accommodate the laminated element assemblies 40, and the module case cover 43, will be described. A perspective view of the module case main body 41 in the present invention, is shown in FIG. 5, and a perspective view of the module case cover 43 in the present invention, is shown in FIG. 6.

Figure 5:
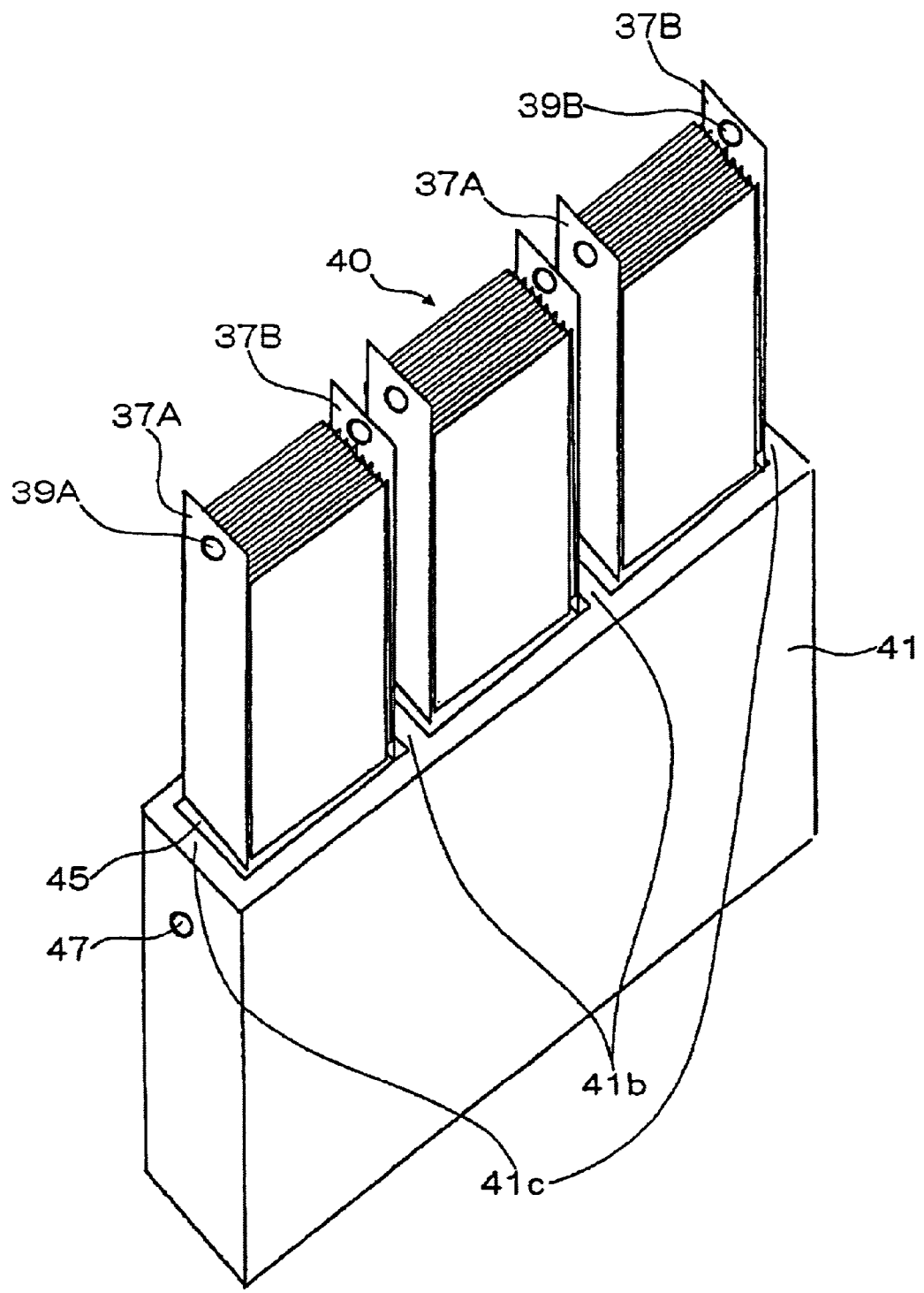
FIG. 5 is a perspective view of the module case main body.
Figure 6:
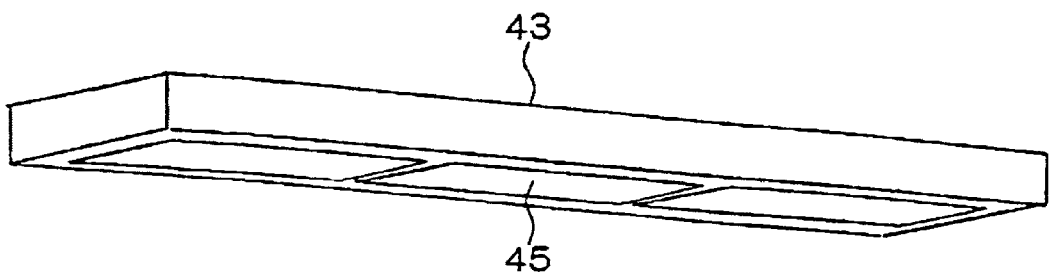
FIG. 6 is a perspective view of the module case cover.

Referring to FIGS. 5 and 6, in the module case main body 41 and the module case cover 43, which are both made of a resin, a plurality of element compartments 45 are formed which are partitioned independently one another.

The laminated element assemblies 40 are sufficiently impregnated with the electrolyte. And, the impregnated laminated element assemblies 40 are, respectively, accommodated in the element compartments 45, so that the positive electrode metal current collector plate 37A of one of the adjacent laminated element assemblies 40 faces the negative metal current collector plate 37B of the other element assembly via a partition wall 41b.

In both side walls 41c and partition walls 41b of the module case main body 41, through-holes 47 are, respectively, formed at facing positions. These through-holes 47 are designed so that when the laminated element assemblies 40 are accommodated in the element compartments 45, the positions of the through-holes will agree with the through-holes 39 of the metal current collector plates 37. Through the through-hole 47 and the through-hole 39a of the laminated element assembly 40 disposed at the left end in FIG. 5, an external terminal bolt 49 is inserted and fixed.

Sealing is secured by an O-ring between the external terminal bolt 49 and the through-hole 39A or 47. The same applies to the through-hole 47 and the through-hole 39B of the laminated element assembly 40 disposed at the right end in FIG. 5.

Further, through a through-hole 47 of a partition wall 41b and a through-hole 39A or 39B of the adjacent laminated element assembly 40, an internal terminal bolt (not shown) is inserted and fixed. Sealing is secured by an O-ring between the internal terminal bolt and the through-hole 39A or 39B.

The material for the O-ring is not particularly limited, so long as it is a material which is not eroded by the non-aqueous electrolyte used. For example, fluorine rubber, EPDM, butyl rubber or silicon rubber may suitably be used. The material for the internal terminal bolt is not particularly limited so long as it has high electrical conductivity and high electrochemical corrosion resistance, but aluminum or an aluminum alloy is, for example, preferred.

Between the internal terminal bolt and the metal current collector plate 37 of the laminated element assembly 40, in addition to the electrical connection, mechanical fixing treatment of the laminated element assembly 40 will be carried out. As such a method, mechanical tying between the internal terminal bolt and the metal current collector plate 37 is common, but welding such as laser welding or electron beam welding may also be employed.

Figure 7:
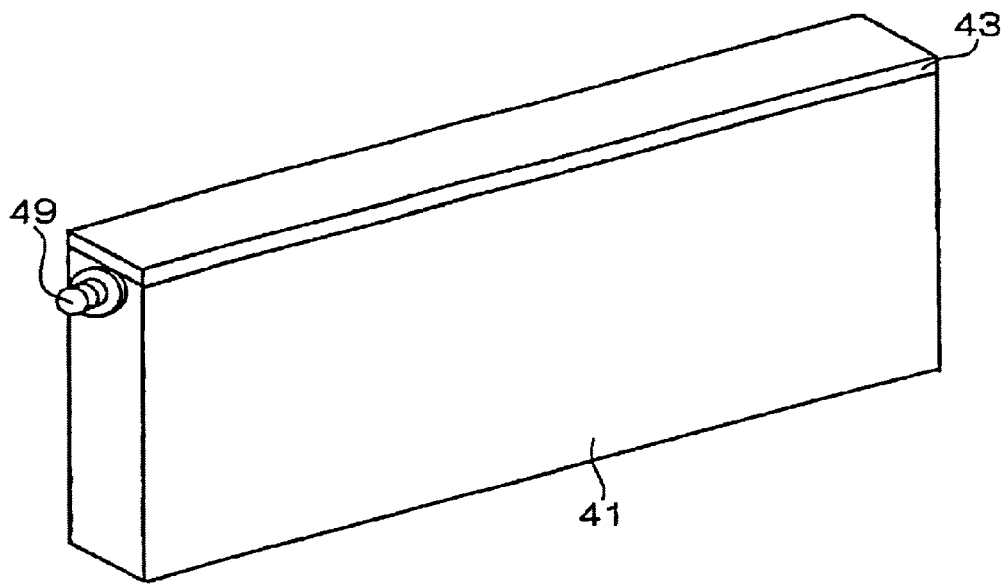
FIG. 7 is a perspective view of a laminated electric double layer capacitor module.
Figure 8:
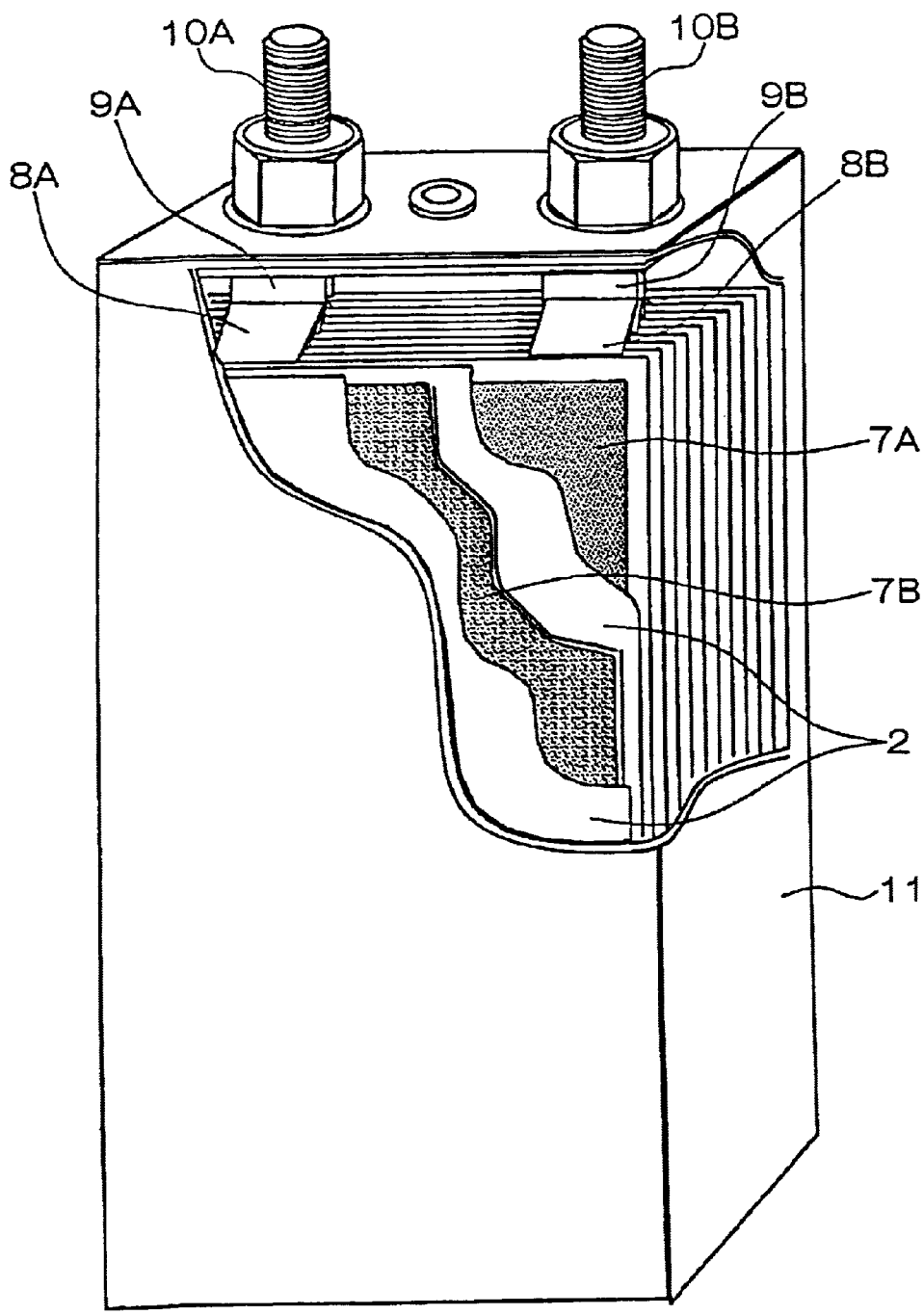
FIG. 8 shows the structure of a conventional prismatic cell.
Figure 9:
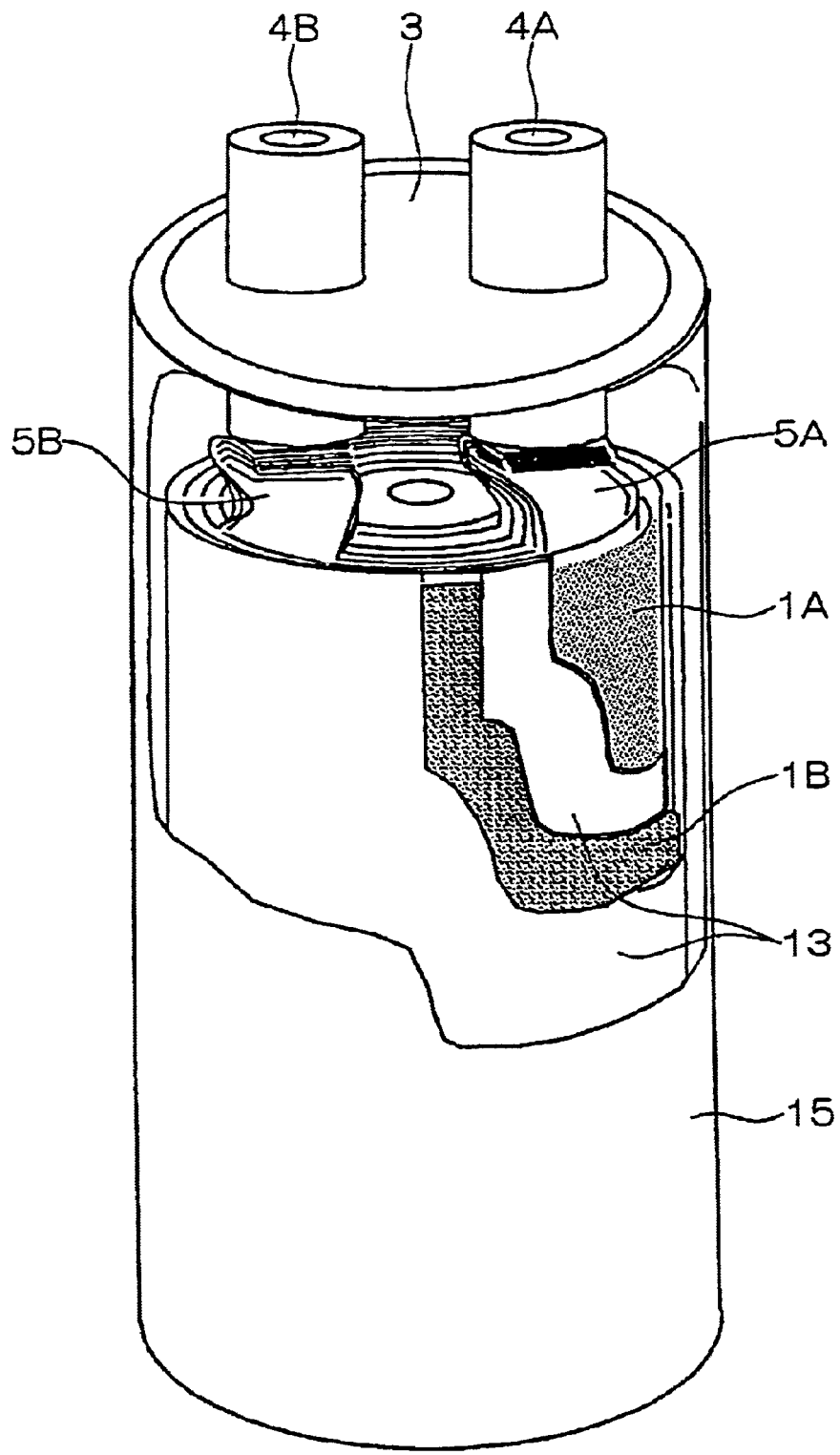
FIG. 9 shows the structure of a conventional cylindrical cell.
Figure 10:
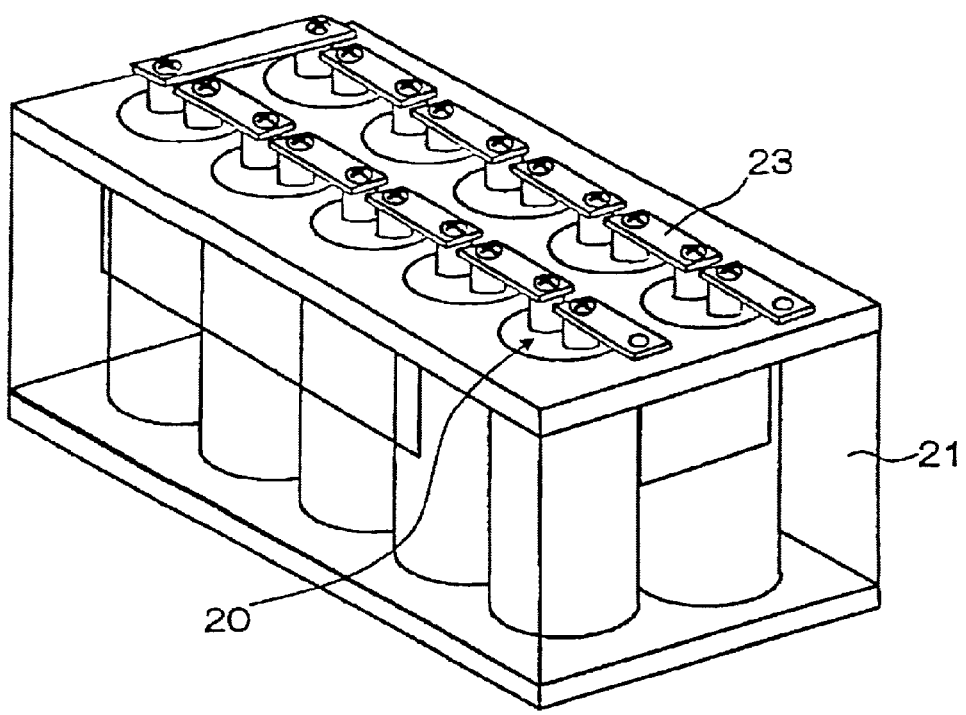
FIG. 10 is a view showing the structure of a conventional electric double layer capacitor module.

The laminated element assemblies 40 are thus electrically connected in series. By closing and sealing by the module case cover 43 in this state, a laminate electric double layer capacitor module as shown in FIG. 7, will be obtained.

The number of element compartments 45 formed in the module case main body 41 and the module case cover 43, is not particularly limited and may be optionally determined depending upon the particular purpose and the required module voltage. However, usually, it is preferably from 2 to 10.

The material for the module case main body 23 and the module case cover 25 is suitably selected taking into consideration the electrical insulating property, the mechanical strength, the moisture shielding property and the resistance against the non-aqueous electrolyte to be used.

In a usual case, a polyolefin (PP, PE), a polyethylene terephthalate (PET), a polyparaphenylene sulfide (PPS), a polyimide or a polyamideimide, is, for example, suitable. A polymer alloy containing such a polymer may also be used. Further, in order to increase the strength, a filler such as inorganic fibers, may be mixed, or in order to prevent permeation of moisture, surface treatment may be applied.

Further, the internal terminal bolts and the external terminal bolts 49 may also be attached by molding to be integral with the inner partition walls of the closed container, whereby a good sealing state can be secured. The method for sealing the cover made of a resin and the module case made of a resin may, for example, be fusion by heat melting, ultrasonic wave fusion, adhesion by means of various sealing agents, hot melt or adhesives, or press sealing by a packing material.

As described in the foregoing, according to the present invention, it is possible to increase the energy density per volume or per weight, as a module power source. Further, the process until the final laminated module power source is prepared, can be simplified, and the number of components required is small, whereby the productivity is excellent, and the cost can be reduced. Further, adjacent unit cells can be connected in the minimum distance without requiring bus bars or the like, whereby the resistance as a module power source can be made low.

The entire disclosure of Japanese Patent Application No. 2001-230235 filed on Jul. 30, 2001 including specification, claims, drawings and summary are incorporated herein by reference in its entirety.

What is claimed is:

1. A laminated electric double layer capacitor module comprising:
   electrode assemblies for positive and negative electrodes disposed to face each other, each comprising a metal current collector foil and an electrode layer made of a large surface area material, formed on at least one surface of the foil except for an end strip portion along one side end of the foil;
   an ion permeable separator disposed between the adjacent electrode assemblies to separate the respective electrode layers from each other;
   a metal current collector plate for positive electrodes and a metal current collector plate for negative electrodes, electrically connected to the end strip portion of each electrode assembly for positive electrode and the end strip portion of each electrode assembly for negative electrode, respectively;
   an electrolyte; and
   a module case; wherein:
   a) the electrode assemblies for positive and negative electrodes are alternately laminated in plurality so that the respective end strip portions are projected from the separators on opposite sides, to form a laminated element;
   b) the metal current collector plate for positive electrodes, is disposed at the end of the laminated element on the side where the end strip portions of the metal current collector foils for positive electrodes are projected from the separators;
   c) the metal current collector plate for negative electrodes, is disposed at the end of the laminated element on the side where the end strip portions of the metal current collector foils for negative electrodes are projected from the separators;
   d) the electrode assemblies, the separators, the current collector plate for positive electrodes and the current collector plate for negative electrodes, are integrated to constitute a laminated element assembly;
   e) a plurality of such laminated element assemblies are provided, and each of them is accommodated and protected in one of element compartments formed in plurality in the module case; and
   f) the plurality of the laminated element assemblies accommodated in the plurality of the element compartments, respectively, are electrically connected in series.

2. The laminated electric double layer capacitor module according to claim 1, wherein the module case comprises a module case main body provided with said element compartments, and a module case cover to close the module case main body.

3. The laminated electric double layer capacitor module according to claim 2, which is provided with a connecting means connected to the current collector plate for positive electrodes and/or the current collector plate for negative electrodes through a partition wall partitioning the adjacent element compartments of the module case main body or through both side walls of the module case main body.

4. The laminated electric double layer capacitor module according to claim 1, wherein at each of the positive electrodes and the negative electrodes, the end strip portion of the metal current collector foil and the metal current collector plate are bonded by welding.

5. The laminated electric double layer capacitor module according to claim 1, wherein the adjacent two laminated element assemblies accommodated in the element compartments, are disposed so that the metal current collector plate for positive electrodes of one laminated element assembly faces the metal current collector plate for negative electrodes of the other laminated element assembly via a partition wall.

6. The laminated electric double layer capacitor module according to claim 1, wherein the module case is made of a polyolefin, a polyethylene terephthalate, a polyparaphenylene sulfide, a polyimide, a polyamide or a polymer alloy containing such polymers.

7. The laminated electric double layer capacitor module according to claim 6, wherein the electrolyte is a non-aqueous electrolyte.

8. The laminated electric double layer capacitor module according to claim 3, wherein the adjacent two laminated element assemblies accommodated in the element compartments, are disposed so that the metal current collector plate for positive electrodes of one laminated element assembly faces the metal current collector plate for negative electrodes of the other laminated element assembly via said partition wall.

9. The laminated electric double layer capacitor module according to claim 3, wherein at each of the positive electrodes and the negative electrodes, the end strip portion of the metal current collector foil and the metal current collector plate are bonded by welding.

10. The laminated electric double layer capacitor module according to claim 3, wherein the module case is made of a polyolefin, a polyethylene terephthalate, a polyparaphenylene sulfide, a polyimide, a polyamide or a polymer alloy containing such polymers.

11. The laminated electric double layer capacitor module according to claim 10, wherein the electrolyte is a non-aqueous electrolyte.

* * * * *